(12) United States Patent
Farel et al.

(10) Patent No.: US 8,565,395 B2
(45) Date of Patent: Oct. 22, 2013

(54) VOIP MASTER CALL DETAIL RECORD

(75) Inventors: Richard A. Farel, Englishtown, NJ (US); Arunabha Guha, Manalapan, NJ (US); Richard Oppenheim, Tinton Falls, NJ (US); Alek S. Remash, Princeton, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 945 days.

(21) Appl. No.: 12/647,816

(22) Filed: Dec. 28, 2009

(65) Prior Publication Data
US 2011/0158395 A1 Jun. 30, 2011

(51) Int. Cl.
*H04M 15/00* (2006.01)
(52) U.S. Cl.
USPC ..................... 379/126; 379/112.01
(58) Field of Classification Search
USPC ............................ 379/126, 112.01
See application file for complete search history.

(56) References Cited

U.S. PATENT DOCUMENTS

| | | | |
|---|---|---|---|
| 6,694,001 B1* | 2/2004 | Lampell et al. | 379/189 |
| 6,721,405 B1* | 4/2004 | Nolting et al. | 379/133 |
| 6,891,938 B1* | 5/2005 | Scott et al. | 379/112.06 |
| 7,424,103 B2* | 9/2008 | Kernohan et al. | 379/126 |
| 7,729,483 B2* | 6/2010 | Van Natter et al. | 379/114.03 |
| 8,150,006 B2* | 4/2012 | Dowens et al. | 379/112.01 |
| 2006/0045251 A1* | 3/2006 | Liu et al. | 379/127.01 |

* cited by examiner

*Primary Examiner* — Joseph T Phan
(74) *Attorney, Agent, or Firm* — Hoffmann & Baron, LLP (57) ABSTRACT

A method and system of processing call detail records (CDRs) of multiple network elements in a communication network are disclosed. The method includes identifying at least one final attempt CDR out a plurality of CDRs from the multiple network elements by at least one type of network element. At least one master CDR is built from the identified at least one final attempt CDR. Further, at least one CDR from the plurality of CDRs is correlated to the at least one master CDR according to a correlation rule. Also, the at least one master CDR is then augmented with CDR data from the at least one correlated CDR.

20 Claims, 7 Drawing Sheets

| Traffic Report Date: xx/xx/xx | CALLS | BLOCKS | CUTOFF |
|---|---|---|---|
| Overall: | 202753 | 632 | 1856 |
| PSTN Originated Calls: | | | |
| Service Type | CALLS | BLOCKS | CUTOFF |
| Type A | 30359 | 1 | 517 |
| Type B | 48603 | 0 | 828 |
| Type C | 7115 | 18 | 0 |
| Type D | 5267 | 8 | 0 |
| Type E | 3076 | 37 | 26 |
| Type F | 534 | 6 | 0 |
| Undetermined | 499 | 221 | 0 |
| PSTN Originated Total: | 135453 | 291 | 1371 |
| IP Originated Calls: | | | |
| Service Type | CALLS | BLOCKS | CUTOFF |
| Type G | 35562 | 197 | 450 |
| Type A | 263 | 0 | 0 |
| Type B | 598 | 6 | 0 |
| Type C | 32 | 2 | 0 |
| Type D | 4593 | 14 | 4 |
| Type E | 25991 | 119 | 24 |
| Type F | 204 | 0 | 8 |
| Undetermined | 57 | 3 | 0 |
| IP Originated Total: | 67300 | 341 | 485 |

FIG. 5

IPBE

| STOP | 10.0.124.5: 17040 | 10.0.75.164: 26904 | 16:46:07.1 DEC 01 2009 | 16:48:18.0 DEC 01 2009 | 0 | 1 | 999-555-1111 | 777-555-9999 | IP_TO_PSTN | B | NewYork_12 | ipbe01547805 |
|---|---|---|---|---|---|---|---|---|---|---|---|---|
| 602 | 604 | 606 | 608 | 610 | 612 | 614 | 616 | 618 | 620 | 622 | 624 | 626 |

CCS

| STOP | 777-555-9999 | 999-555-1111 | 16 | 10.0.124.5: 17040 | 2009-01-12 16:46:07.8 | 2009-01-12 16:48:18.0 | Washington_5 | ccs01255218 |
|---|---|---|---|---|---|---|---|---|
| 628 | 630 | 632 | 634 | 636 | 638 | 640 | 642 | 644 |

| STOP | 20091201 16:46:07.2 | 20091201 16:48:17.9 | 487 | 1 | 999-555-1111 | 777-555-9999 | 2009-01-12 16:46:07.8 | 10.0.124.5: 17040 | B | Atlanta_2 | as01298853 |
|---|---|---|---|---|---|---|---|---|---|---|---|
| 646 | 648 | 650 | 652 | 654 | 656 | 658 | 660 | 662 | 664 | 666 |

NGBE

| ATTEMPT | 12/01/2009 16:46:07.8 | 12/01/2009 16:46:07.8 | 999-555-1111 | 777-555-9999 | 12/01/2009 16:46:07.8 | 34 | IP_TO_PSTN | 0 | 10.0.85.62: 32000 | 10.0.124.5: 17040 | B | Chicago_4 | ngbe00366391 |
|---|---|---|---|---|---|---|---|---|---|---|---|---|---|
| 668 | 670 | 670 | 672 | 674 | 676 | 678 | 680 | 682 | 684 | 686 | 688 | 690 | 692 |

NGBE

| STOP | 12/01/2009 16:46:07.9 | 12/01/2009 16:48:18.2 | 999-555-1111 | 777-555-9999 | 12/01/2009 16:46:07.8 | 16 | IP_TO_PSTN | 1 | 10.0.75.164: 26904 | 10.0.124.5: 17040 | B | Cleveland_1 | ngbe06957200 |
|---|---|---|---|---|---|---|---|---|---|---|---|---|---|
| 668 | 670 | 670 | 672 | 674 | 676 | 678 | 680 | 682 | 684 | 686 | 688 | 690 | 692 |

FIG. 8

VOIP MASTER CALL DETAIL RECORD

BACKGROUND

1. Field of Technology

The present application relates generally to telecommunication networks. More specifically, the present application is directed to processing call detail records (CDRs) in a voice-over-IP (VoIP) telecommunication network.

2. Brief Description of Related Art

A VoIP telecommunication network generally includes a plurality of network elements (NEs) that facilitates connection (setup) of endpoints of one or more calls and transmission (transport) of telecommunication data between the endpoints of the call over the VoIP telecommunication network.

Typically, several NEs are involved in call setup and transport. A simple call may involve just a few NEs while a complex call may involve many NEs. Calls that encounter problems during call setup are generally automatically retried through different NEs adding to the number of NEs associated with these calls.

The NEs associated with a call typically generate call detail records (CDRs). The CDRs for a given call may have some common but also some unique call-related information. Typical call-related information indicated in a CDR can include start and end times of a call, call duration, calling and called telephone numbers, addressing of the NEs associated with the call, as well as other pertinent call-related information. The type of call-related information, its formatting and location in CDRs from different NEs can differ widely.

For various reasons, CDRs frequently have missing or incomplete call-related information making their correlation to a given call difficult. Accordingly, fault identification and reporting in the VoIP telecommunication network has been affected negatively.

There have been attempts to use a unique call ID in the CDRs as a correlation key for a given call. This can be successful only if: (1) call IDs are in fact recorded in the CDRs; and (2) the call IDs do not change as the call progresses between various NEs. However, in practice, neither of the foregoing requirements has been satisfied generally. Alternative attempts have used CDRs from a given NE type in isolation of all other NE types. However, this at best paints an incomplete connection/transmission picture for any given call.

SUMMARY

In accordance with an embodiment, a method of processing call detail records (CDRs) of multiple network elements in a communication network is disclosed. The method includes identifying at least one final attempt CDR out a plurality of CDRs from the multiple network elements by at least one type of network element. At least one master CDR is then built from the identified at least one final attempt CDR. Further, at least one CDR from the plurality of CDRs is correlated to the at least one master CDR according to a correlation rule. Also, the at least one master CDR is then augmented with CDR data from the at least one correlated CDR.

In accordance with another embodiment, a system to process call detail records (CDRs) of multiple network elements in a communication network is disclosed. The system includes a final attempt identification device, master CDR build device, and CDR correlation device. The final attempt identification device is configured to identify at least one final attempt CDR out a plurality of CDRs from multiple network elements of the communication network by at least one type of network element. The master CDR build device is configured to build at least one master CDR from the identified at least one final attempt CDR. The CDR correlation device is configured to correlate at least one CDR from the plurality of CDRs to the at least one master CDR according to a correlation rule. Furthermore, the CDR correlation device is also configured to augment the at least one master CDR with CDR data from the at least one correlated CDR.

In accordance with yet another embodiment, a machine-readable storage medium is disclosed. The machine-readable storage medium includes operational instructions that, when executed by a processor, cause the processor to identify at least one final attempt call detail record (CDR) out a plurality of CDRs from multiple network elements of a communication network by at least one type of network element. The machine-readable storage medium also includes operational instructions that, when executed by a processor, cause the processor to build at least one master CDR from the identified at least one final attempt CDR.

The machine-readable storage medium further includes operational instructions that, when executed by a processor, cause the processor to correlate at least one CDR from the plurality of CDRs to the at least one master CDR according to a correlation rule. In addition, the machine-readable storage medium includes operational instructions that, when executed by a processor, cause the processor to augment the at least one master CDR with CDR data from the at least one correlated CDR.

These and other purposes, goals and advantages of the present application will become apparent from the following detailed description of example embodiments read in connection with the accompanying drawings.

BRIEF DESCRIPTION OF THE DRAWINGS

Some embodiments are illustrated by way of example and not limitation in the figures of the accompanying drawings in which:

FIGS. 6A-6E illustrate example call detail records (CDRs) that are generated by various network elements of a VoIP trusted network illustrated in FIG. 1;

DETAILED DESCRIPTION

An example system and method of processing call detail records (CDRs) are disclosed herein. In the following description, for the purposes of explanation, numerous specific details are set forth in order to provide a thorough understanding of example embodiments. It will be evident, however, to one skilled in the art, that an example embodiment may be practiced without all of the disclosed specific details.

Figure 1:
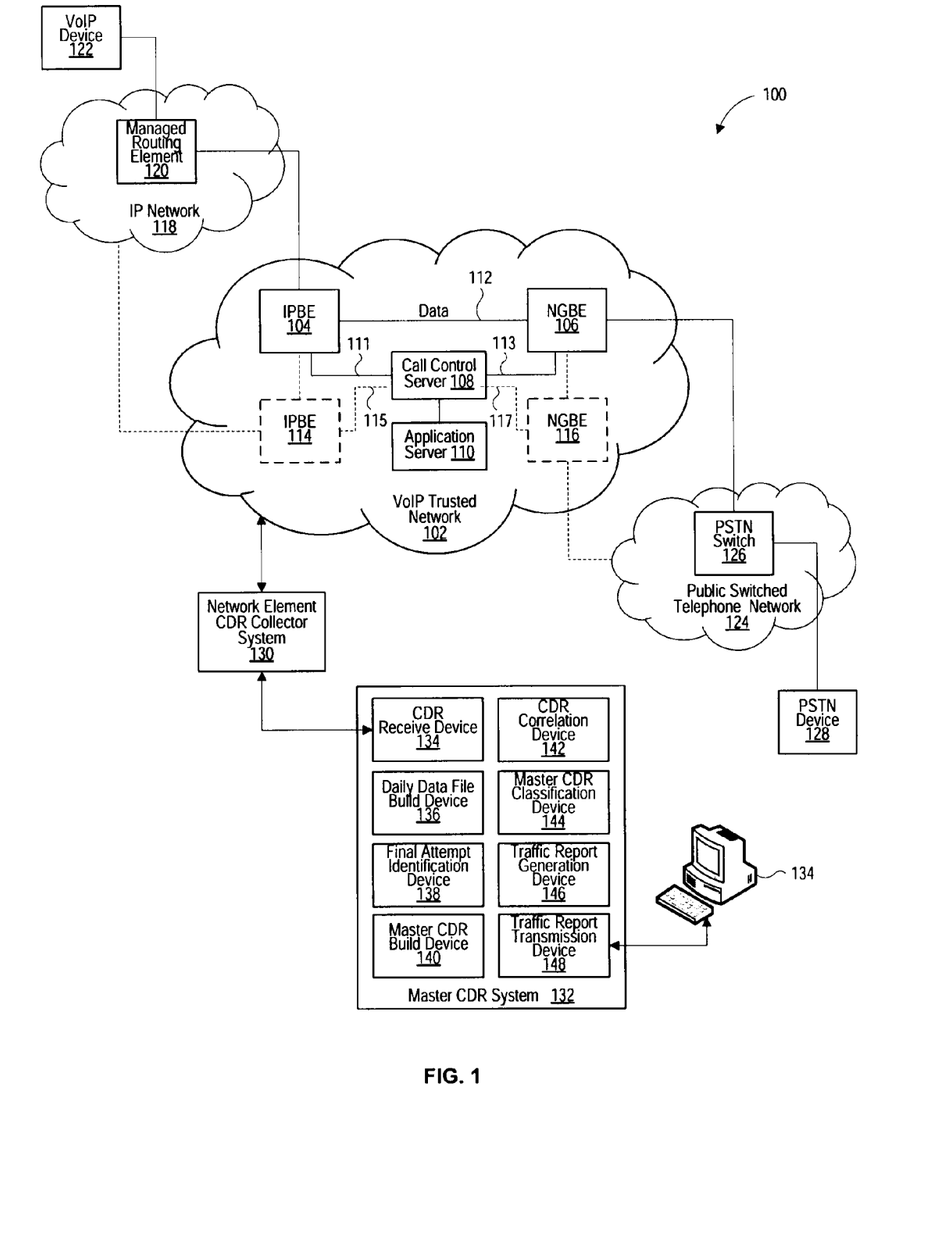
FIG. 1 illustrates a block diagram of an example telecommunication system.

FIG. 1 illustrates a block diagram of an example telecommunication system 100. The telecommunication system 100 includes a voice over IP (VoIP) trusted network 102, IP network 118, public switched telephone network (PSTN) 124, devices (endpoints) 122, 128, network element CDR collector system 130, master CDR generation and reporting system 132, and a computing system 134.

The transmission network 102 is configured to connect (set up) endpoints 122, 128 and to transmit (transport) telecommunication content (e.g., video, audio, text and audiovisual content) associated with telecommunication services (e.g., telephone, teleconferencing and videoconferencing, as well as, other electronic services) provided by a telecommunication provider (not shown) between the endpoints. The setup and transport of telecommunication content over the VoIP trusted network 102 can be accomplished via Transfer Control Protocol/Internet Protocol (TCP/IP), User Datagram Protocol (UDP)/IP, any combination of conventional protocols or yet to be developed protocols. These protocols can also include H.323, Real-time Transport Protocol (RTP) and Session Initiation Protocol (SIP).

The VoIP trusted network 102 includes a plurality of network elements, such as, NEs 104, 106, 108, 110, 114 and 116, which are configured to provide call setup and transport of telecommunication content between devices (endpoints), such as devices 122, 128. As an example, the call control server (CCS) 108 supported by the application server (AS) 110 can establish a connection between an IP border element (IPBE) 104 associated with a call request from a VoIP device 122 and a network gateway border element (NGBE) 106 to provide transport of telecommunication content between the VoIP device 122 and a PSTN device 128 via the VoIP trusted network 102.

The CCS 108 can provide basic call setup and routing logic and the AS 110 can provide complex business and customer specific logic (e.g., private dial plans, call line features, such as, call waiting, call forwarding, call transfer, number translation, voice messaging, access to external data bases, and any other call line features). The VoIP device 122 can be an end-user device (e.g., VoIP telephone, soft phone, or other device) or a multipoint control unit (MCU) to facilitate setup and transport associated with multiple end-user devices, such as devices 122,128, in teleconferencing, videoconferencing and/or data conferencing.

As another example, the call control server (CCS) 108 supported by the application server (AS) 110 can similarly establish a connection between the NGBE 106 associated with a call request from the PSTN device 128 and the IPBE 104 to set up a call and to provide transport of telecommunication content between the PSTN device 128 and the VoIP device 122 via the VoIP trusted network 102. The PSTN device 128 can be an end-user device (e.g., PSTN telephone or other telephone device) or a PSTN conference bridge to facilitate setup and transport associated with multiple end-user devices, such as devices 122,128, in teleconferencing, videoconferencing and/or data conferencing.

In some embodiments of the VoIP trusted network 102, there may be multiple NEs of a particular NE type, such as IPBEs 104, 114 and NGBEs 106, 116, as well as multiple CCSs 108 and APs 110. At least one IPBE 104, 114 can access one or more CCSs, such as CCS 108. Similarly, at least one NGBE 106, 116 can access one or more CCSs, such as CCS 108. In these embodiments, the IPBEs 104, 114 and the CCS 108 can signal each other via respective signaling paths 111, 115, and the NGBEs 106, 116 and the CCS 108 can signal each other via respective signaling paths 113, 117 to set up data connections.

For example, signalizing between the NEs can set up a data connection 112 between IPBE 104 and NGBE 106 for transport of telecommunication content via the VoIP trusted network 102 between devices (endpoints) 122, 128. The signaling can be accomplished via SIP and data transport can be accomplished via RTP. Alternate signaling and transport protocols can be used. Although only one data connection 112 is shown to simply the description, it should be noted that in various embodiments alternate or additional data connections can be set up between various NEs, such as, IBPEs 104, 114, NGBEs 106, 116, as well as between IPBE 104 and NGBE 116, IPBE 114 and NGBE 106.

The IP network 118 is configured to route set up of a call and transport of telecommunication content of the call between the VoIP device 122 and the VoIP trusted network 102. The IP network 118 can be the Internet. In some embodiments, the IP network 118 can be a virtual private network (VPN) carried over the Internet. Alternate IP networks can be employed. In some alternate embodiments, the IP network 118 can be a VoIP trusted network operated by a different telephone service provider than the VoIP trusted network 102, in which case the devices behind IP network 118 can be PSTN devices.

Furthermore, the IP network 118 can include a managed routing element 120 that can route set up and transport between the VoIP device 122 and the IPBE device 104, 114. The routing element can be a router, gateway or any other device capable of routing set up and transport of telecommunication content. Although only one VoIP device 122 and one managed routing element 120 are shown for brevity and clarity, it should be understood that the IP network 118 can include multiple managed routing elements 120 and multiple VoIP devices 122 can be routed via one or more of the multiple managed routing elements 120.

The public switched telephone network (PSTN) 124 is configured to provide switching of set up of a call and transport of telecommunication content of the call between the PSTN device 128 and the VoIP trusted network 102. More specifically, the PSTN network 124 includes a PSTN switch 126 that can provide switching of set up and transport between the PSTN device 128 and the NGBE device 106, 116. The PSTN switch 126 can be a local switch or any other device capable of switching set up of a call and transport of telecommunication content between the PSTN device 128 and the NGBE device 106, 116. Although only one PSTN device 128 and one PSTN switch 126 are shown for brevity and clarity, it should be understood that the public switched telephone network 124 can include multiple PSTN switches 126 and multiple PSTN devices 128 can be switched via one or more of the multiple PSTN switches 126.

The network element CDR collector system 130 is configured to periodically collect CDRs generated by the NEs of the VoIP trusted network 102 and further configured to transmit the collected CDRs to the master CDR system 132. For example, the network element CDR collector system 130 can periodically poll the IPBEs 104, 114, CCS 10, AS 110 and NGBEs 106, 116 for any generated CDRs. Alternatively, the IPBEs 104, 114, CCS 10, AS 110 and NGBEs 106, 116 can be configured to push the generated CDRs to network element CDR collector system 130 periodically or as they are generated by respective NEs.

Further with reference to the network element CDR collector system 130, the periods of polling for or pushing of generated CDRs can be set to desired time intervals based on requirements of the telecommunication system 100, such as every five (5) minutes. Furthermore, the network element CDR collector system 130 can periodically transmit the collected CDRs to the master CDR system 132. The transmission periodicity can also be every five (5) minutes, or less frequently, such as every fifteen (15) minutes, hourly or daily.

The master CDR system 132 is configured to periodically receive CDRs from the network element CDR collector system 130. The master CDR system 132 is further configured to generate one or more master CDRs each associated with a call, correlate a plurality of CDRs associated with the call to the respective master CDR and to generate one or more traffic and defect reports (traffic reports) in connection with calls over the VoIP trusted network 102 from the master CDRs based on at least one call metric associated with the calls (e.g., service type, call direction, call-level classification, and/or one or more other call-associated metrics). The master CDR system 132 includes a CDR receive device 134, daily data file build device 136, final attempt CDR identification device 138, master CDR build device 140, CDR correlation device 142, master CDR classification device 144, traffic report generation device 146, and report device 148.

The CDR receive device 134 is configured to receive CDRs generated by the network elements 104-116 of the VoIP trusted network 102 from the network element CDR collector system 130.

The daily data file build device 136 is configured to build or generate a daily data file for each type of network element (e.g., IPBE data file, CCS data file, AS data, NGBE data file, as well as any other NE data file of VoIP trusted network 102). For example, the IPBE data file will include all CDRs from IPBE network elements 104, 114 of VoIP trusted network 102. As another example, the NGBE data file will include all CDRs from NGBE network elements 106, 116 of VoIP trusted network 102. Another daily data file will similarly include all CDR from a particular type of NE of the VoIP trusted network 102.

The final attempt CDR identification device 138 is configured to identify final attempt CDRs for calls in the respective daily data files of the different NE types (e.g., IPBEs 104, 114, CCSs 108, ASs 110, NGBEs 106, 116). For example, the final attempt CDRs can include last failed call attempt CDRs for the calls attempted and not connected and answered call CDRs for calls that were connected.

The master CDR build device 140 is configured to build master CDRs in a master CDR daily data file from the IPBE and the NGBE final attempt CDRs identified by the final attempt CDR identification device 138 in the IPBE daily data file and NGBE daily data file, respectively.

The CDR correlation device 142 is configured to correlate one or more CDRs in the daily data files to a master CDR in the master CDR data file based on at least one correlation rule as described with reference to FIG. 4 below. The CDR correlation device 142 is further configured to mark the correlated CDRs to the daily data files as "used" to ensure that a CDR will be correlated to only one master CDR. The CDR correlation device 142 is also configured to augment the master CDR with CDR data from the correlated CDRs as described with reference to FIGS. 2 and 3 below.

The master CDR classification device 144 is configured to augment the CDR data (of the master CDR) for a correlated CDR with a call classification that is derived or determined from the CDR data, such as cutoff, answered, ring-no-answer, user-busy, dialed-number-error, and blocked. These classifications will be described in greater detail with reference to FIG. 4 below. The master CDR classification device 144 is further configured to determine a network element (NE) classification for the correlated CDRs for each type of network element (NE) based on the call classification of the constituent CDR data in the master CDR according to a first classification rule, as will be described in greater detail with reference to FIG. 4 below. The master CDR classification device 144 is also configured to determine a master call level classification for the master CDR based on the NE classifications of CDRs correlated to the master CDR according to a second classification rule, as will be described in greater detail with reference to FIG. 4 below.

The traffic report generation device 146 is configured to generate a daily traffic report from the master CDRs based on at least one call metric of the master CDRs, such as service type, call direction and master call level classification. An example report is described in greater detail below with reference to FIG. 5.

The report device 148 is configured to receive a request for a traffic report and to transmit the generated traffic report to the computing system 134. The generation of master CDRs, correlation of the plurality of CDRs to the master CDRs and generation of the traffic report from the master CDRs are described in greater detail with reference to FIGS. 2-7 below.

The computing system 134 is configured request the master CDR system 132 to generate a traffic report for a particular date, and further configured to receive and display or email the generated traffic report to one or more users. The computing system 134 can also request a dump of all master CDRs that were identified as cutoff or blocked for further analysis to identify problems such as failed or misconfigured NEs or other faults in the VoIP trusted network 102. The computing system 134 can further request detailed reports to support capacity planning and further expansion of the VoIP trusted network 102. The detailed reports can also be used by service planners and forecasters to compare actual traffic with prior forecasts and to provide trend data to adjust current forecasts. The reports can also be used to track the overall performance of the VoIP trusted network 102

FIGS. 2A-2D illustrate example call data records (CDRs) generated by the various network elements (NEs) of the VoIP trusted network 102 illustrated in FIG. 1. The CDRs from various NEs can have some common but also some unique call-related information. The ellipses in FIGS. 2A-2D illustrate that additional unique call-related information can be indicated in the various NEs. FIGS. 2A-2D also illustrate common call-related information indicated across the various CDR. It is noted that that the formatting and location of the common call-related information in the various CDRs can vary widely across the different NEs. Additional processing-related information can be added to CDRs as will be described hereinafter. For example, the fields labelled "service type" (reference nos. 222, 262, and 288) in FIGS. 2A-2D are not part of the original CDRs generated by the respective NEs, but rather can be derived and added by the daily data file build device 136 using one of more fields in the received CDRs and a set of rules.

Figure 2A:
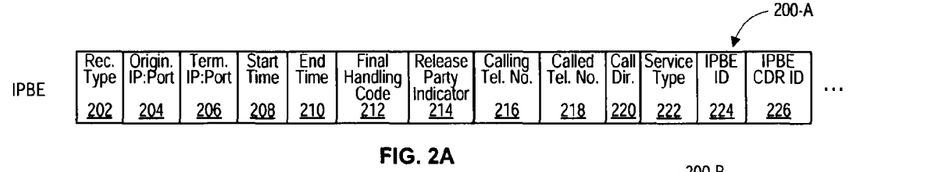
FIGS. 2A-2D illustrate call detail records (CDRs) that are generated by various network elements of a VoIP trusted network illustrated in FIG. 1.

FIG. 2A illustrates call-related information (fields) of an example CDR 200-A generated by an IPBE 104, 114 of FIG. 1. A record type 202 indicates processing-related information that can be added to the CDR 200-A by the master CDR system 132. The record type 202 indicates whether the CDR 200-A is associated with a failed attempt or an answered call. The originating IP:port 204 indicates the IP address and port for the data path at the originating NE endpoint for a call. For example, if the VoIP device 122 sent a request for call to PSTN device 128 via IPBE 104, then field 204 indicates the IP:port at the originating IPBE 104. The terminating IP:port 206 indicates the IP address and port for the data path at the terminating NE endpoint for the call. In the foregoing example, field 206 can indicate the IP:port at the terminating NGBE 106 for the call. In another example, if the PSTN device 128 sent a request for call to VoIP device 122 via NGBE 106, field 204 can indicate the IP:port at the originating NGBE 106 and field 206 can indicate the IP:port at the terminating IPBE 104 for the call.

The start time 208 indicates the date and time associated with the start of the call the end time 210 indicates the date and time associated with the end of the call. If the CDR 200-A is associated with a failed attempt, the start time 208 and end time 210 can indicate the same time. The final handling code 212 is a call completion code that indicates whether the call has been completed normally. For example, a number 16 can indicates a normal call completion, while a number 17 can indicate user busy and numbers 34 and 41 can indicate failed call attempts. The release party indicator 214 indicates which device 122, 128 released the call. For example, an indicator of "1" can indicate that the originating device 122 released the call, while an indicator of "2" can indicate the terminating device 128 released the call. An indicator of "3" can indicate that the NE (e.g., IPBE 104) associated with the CDR 200-A released the call.

The calling telephone number 216 indicates the telephone number of the originating device (e.g., VoIP device 122), while the called telephone number 218 indicates the telephone number of the terminating device (e.g., PSTN device 128). The call direction 220 indicates a direction of the telephone call between the device 122, 128 (e.g., IP_TO_PSTN or PSTN_TO_IP). The service type 222 indicates the particular service type associated with the telephone call. The service type 222 can be a marketing name of a business or consumer service implemented on the VoIP trusted network 102 such as a toll free service, teleconference service, wholesale access service, IP local calling service, Centrex service, or other calling service, which can in many cases be derived from one or more fields of NE CDRs using a set of rules. The IPBE ID 224 indicates a device identification of the NE that has generated the CDR 200-A (e.g., the device identification of the IPBE 104). The IPBE CDR ID 226 indicates a unique identification of each particular CDR generated by the indicated IPBE 104. The IPBE CDR ID 226 can be one assigned by the NE itself, or alternatively, can be assigned by the daily data file build device 136 of the master CDR system 132.

Figure 2B:
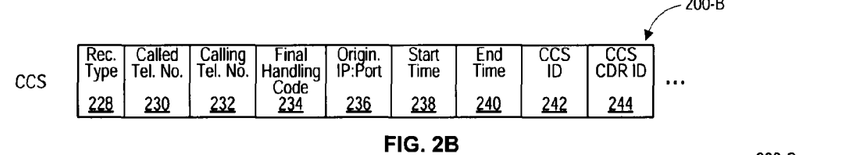

FIG. 2B illustrates call-related information (fields) of an example CDR 200-B generated by a CCS 108 of FIG. 1. The fields of CDR 200-B may be located and formatted differently than the fields of the CDR 200-A. Furthermore, call-related information in some fields may be inaccurate or missing altogether. Record type 228 indicates processing-related information as to whether the CDR 200-B is associated with a failed attempt or an answered call. The called telephone number 230 indicates the telephone number of the terminating device (e.g., PSTN device 128), while calling telephone number 232 indicates the telephone number of the originating device (e.g., VoIP device 122). As shown in CDR 200-B, the telephone number fields 230, 232 are located in different locations are reversed in comparison to CDR 200-A. The final handling code 234 indicates whether the call has been completed normally.

The originating IP:port 236 indicates the IP address and port of an originating NE for a call. For example, field 236 indicates the IP:port of the originating IPBE 104 or NGBE 106. It is noted that a terminating IP:port is not included in the CDR 200-B. Other fields are also not included in the CDR 200-B, such as the release party indicator, call direction field and the service type field. The start time 238 indicates the date and time associated with the start of the call and the end time 240 indicates the date and time associated with the end of the call. The date/time fields 238, 240 of CDR 200-B can have different time values than the date/time fields 208, 210 of CDR 200-A. The CCS ID 242 indicates a device identification of the NE that has generated the CDR 200-B (e.g., the device identification of the CCS 108). The CCS CDR ID 244 indicates a unique identification of each particular CDR generated by the indicated CCS 108. The CCS CDR ID 244 can be assigned by the NE itself, or alternatively, can be assigned by the daily data file build device 136 of the master CDR system 132.

Figure 2C:
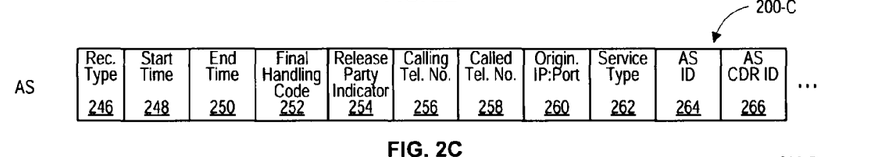

FIG. 2C illustrates call-related information (fields) of an example CDR 200-C generated by an AS 110 of FIG. 1. The fields of CDR 200-C may be located and formatted differently than the fields of the CDRs 200-A and 200B. Similarly, call-related information in some fields may be inaccurate or missing altogether. Record type 246 indicates processing-related information as to whether the CDR 200-C is associated with a failed attempt or an answered call. The start time 248 indicates the date and time associated with the start of the call and the end time 250 indicates the date and time associated with the end of the call. The date/time fields 248, 250 of CDR 200-C can have different time values than the date/time fields 208, 210 of CDR 200-A and date/time fields 238, 240 of CDR 200-B. As shown in CDR 200-C, the date/time fields 248, 250 are located in different locations in comparison to CDR 200-A and CDR 200-B.

The final handling code 252 indicates whether the call has been completed normally and the release party indicator 254 indicates which device 122, 128 released the call.

The calling telephone number 256 indicates the telephone number of the originating device (e.g., VoIP device 122), while the called telephone number 258 indicates the telephone number of the terminating device (e.g., PSTN device 128). As shown in CDR 200-C, the telephone number fields 256, 258 are located in different locations are reversed in comparison to CDR 200-B. The originating IP:port 260 indicates the IP address and port of an originating NE for a call. The service type 262 indicates the particular service type associated with the telephone call. The service type 262 can be a marketing name of a business or consumer service implemented on the VoIP trusted network 102 such as a toll free service, teleconference service, wholesale access service, IP local calling service, Centrex service, or other calling service, which can in many cases be derived from one or more fields of NE CDRs using a set of rules. The AS ID 264 indicates a device identification of the NE that has generated the CDR 200-C (e.g., the device identification of the AS 110). The AS CDR ID 266 indicates a unique identification of each particular CDR generated by the indicated AS 110. The AS CDR ID 266 can be one assigned by the NE itself, or alternatively, can be assigned by the daily data file build device 136 of the master CDR system 132

Figure 2D:
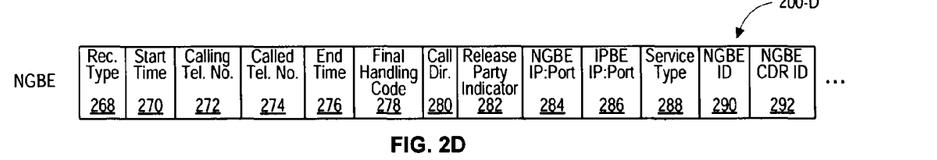

FIG. 2D illustrates call-related information (fields) of an example CDR 200-D generated by an NGBE 106, 116 of FIG. 1. The fields of CDR 200-D may be located and formatted differently than the fields of the CDRs 200-A-200-C. Similarly, call-related information in some fields may be inaccurate or missing altogether. A record type 268 indicates processing-related information that can be added to the CDR 200-D by the master CDR system 132. The record type 268 indicates whether the CDR 200-D is associated with a failed attempt or an answered call. The start time 270 indicates the date and time associated with the start of the call. It is noted that the end time 276 is not located adjacent to the start time 270 in comparison to CDRs 200-A, 200-B, 200C. The calling telephone number 272 indicates the telephone number of the originating device (e.g., VoIP device 122), while the called telephone number 274 indicates the telephone number of the terminating device (e.g., PSTN device 128). The end time 276 indicates the date and time associated with the end of the call. If the CDR 200-D is associated with a failed attempt, the start time 270 and end time 276 can indicate the same time.

The final handling code 278 is a call completion code associated with the call, which can indicate whether the call has been completed normally or can indicate a reason for failure to complete the call normally. The call direction 280 indicates a direction of the telephone call between the device 122, 128 (e.g., IP_TO_PSTN or PSTN_TO_IP). The release party indicator 282 indicates the device 122, 128 that released the call (normally) or the NE that released the call (abnormally).

The NGBE IP:port 284 indicates the IP address and port of an NGBE for a call. For example, field 284 can indicate the IP:port of the NGBE 106. The IPBE IP:port 286 indicates the IP address and port of an IPBE for the call. In the foregoing example, field 286 can indicate the IP:port of the IPBE 104 for the call. The service type 288 indicates the particular service type associated with the telephone call. The service type 288 can be a marketing name of a business or consumer service implemented on the VoIP trusted network 102 such as a toll free service, teleconference service, wholesale access service, IP local calling service, Centrex service, or other calling service, which can in many cases be derived from one or more fields of NE CDRs using a set of rules The NGBE ID 290 indicates a device identification of the NGBE 106 that has generated the CDR 200-D. The NGBE CDR ID 292 indicates a unique identification of each particular CDR generated by the indicated NGBE 106. The NGBE CDR ID 292 can be one assigned by the NE itself, or alternatively, can be assigned by the daily data file build device 136 of the master CDR system 132.

Figure 3:
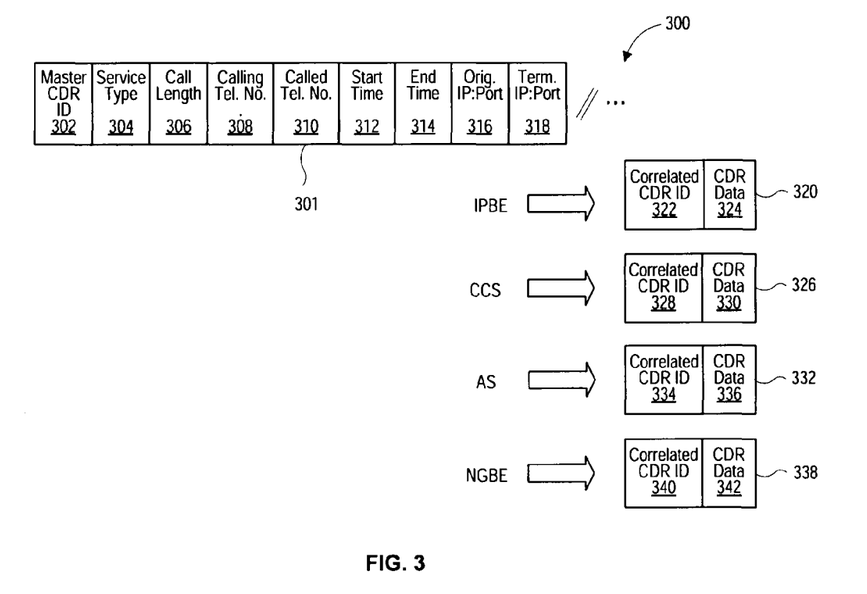
FIG. 3 illustrates a master CDR generated by a master CDR system illustrated in FIG. 1 from CDRs illustrated in FIGS. 2A-2D.

FIG. 3 illustrates call-related information (fields) of an example master CDR 300 generated from the example CDRs 200-A-CDR 200-D of FIG. 2 by the master CDR system 132 of FIG. 1. The master CDR 300 includes base part of call-related information 301 that can be obtained from a CDR of an originating NE (e.g., CDR 200-A generated by IBPE 104) associated with a call (from device 122 to device 128) and one or more additional parts of call-related information 320, 326, 332, 338 that are obtained from one or more CDRs that are correlated to the master CDR for the call. The base part of call-related information 301 can also be obtained from CDR 200-D if the originating NE for a call between the devices 122, 128 was the NGBE 106. The originating NE (e.g., IBPE 104, NGBE 106) for a given call can be determined from the call direction field 220, 280, which can indicate IP_TO_PSTN, PSTN_TO_IP, or IP_TO_IP. In the first and third cases, the IBPE 104 is originating NE; in the second case, the NGBE 106 is the originating NE. For brevity and clarity of the description of FIG. 3, it will be assumed that the IBPE 104 is the originating NE for a given telephone call.

The base part of call-related information 301 includes a master CDR ID 302 that indicates a unique identification of each particular master CDR generated by the master CDR system 132. The service type 304 is obtained from the service type 222 of CDR 200-A generated by the IBPE 104. The call length 306 can be determined from the start time 208 and the end time 210. The calling telephone number 308 and the called telephone number 310 are obtained from the respective telephone number fields 216, 218 of CDR 200-A. The start time 312 and the end time 314 are obtained form the date/time fields 208, 210 of CDR 200-A. The originating IP:port 316 is obtained from the originating IP:port field 204 of CDR 200-A. The terminating IP:port 318 is obtained from the terminating IP:port field 206 of CDR 200-A. If the NGBE 106 were the originating NE of the call based on call direction 280 in CDR 200-D, fields 304, 306, 308, 310, 312, and 314 would have been obtained from the corresponding fields in CDR 200-D and fields 316, 318 would have been obtained from fields 284, 286 respectively in CDR 200-D. At times, one or more of the fields needed to populate the base 301 in the master CDR 300 may not be populated in the originating NE CDR (e.g., the daily data file build device 136 may have been unable to determine the service type, the calling number field may have been unavailable, or one of the IP:Port fields may have been blank or populated with a dummy value 0.0.0.0:0). When this happens, the CDR correlation device 142 will endeavor to populate the missing fields in the base 301 with values obtained from the fields of one of the correlated CDRs.

The one or more additional parts of call-related information 320, 326, 332, 338 can be obtained from the one or more CDRs 200A-200-D, which are correlated to the master CDR for the call. Each additional part 320, 326, 332, 338 can also include a call classification derived or determined from other call-related information of that additional part for the associated NE. The call classification of the NE associated with that call is one of: cutoff, answered, ring-no-answer, user-busy, dialed-number-error, and blocked. Correlation of CDRs 200-A-200-D to the master CDR 300 will be described in greater detail hereinbelow. At this point it is assumed that CDRs 200-A-200-D can be correlated to the master CDR 300.

The call-related information of additional part 320 from the correlated CDR 200-A of IPBE 104 includes the following call-related information: correlated CDR ID 322 and concatenated CDR data 324. The correlated CDR ID 322 is IPBE CDR ID 226 of CDR 200-A. The concatenated CDR data 324 includes record type 202, call direction 220, final handling code 212, release party indicator 214, service type 222, IPBE ID 224 and a call classification that is determined from the foregoing call-related information of the additional part 320 for the IPBE 104.

The call-related information of additional part 326 from the correlated CDR 200-B of CCS 108 includes the following call-related information: correlated CDR ID 328 and concatenated CDR data 330. The correlated CDR ID 328 is CCS CDR ID 244 of CDR 200-B. The concatenated CDR data 330 includes record type 228, final handling code 234, CCS ID 242 and a call classification that is determined from foregoing call-related information of the additional part 326 for the CCS 108.

The call-related information of additional part 332 from the correlated CDR 200-C of AS 110 includes the following call-related information: correlated CDR ID 334 and concatenated CDR data 336. The correlated CDR ID 334 is AS CDR ID 266 of CDR 200-C. The concatenated CDR data 336 includes record type 246, final handling code 252, service type 262, CCS ID 264 and a call classification that is determined from foregoing call-related information of the additional part 332 for the AS 110.

The call-related information of additional part 338 from the correlated CDR 200-D of NGBE 106 includes the following call-related information: correlated CDR ID 340 and concatenated CDR data 342. The correlated CDR ID 340 is NGBE CDR ID 292 of CDR 200-D. The concatenated CDR data 342 includes record type 268, call direction 280, final handling code 278, release party indicator 282, service type 288, NGBE ID 290 and a call classification that is determined from the foregoing call-related information of the additional part 338 for the NGBE 106.

Figure 4:
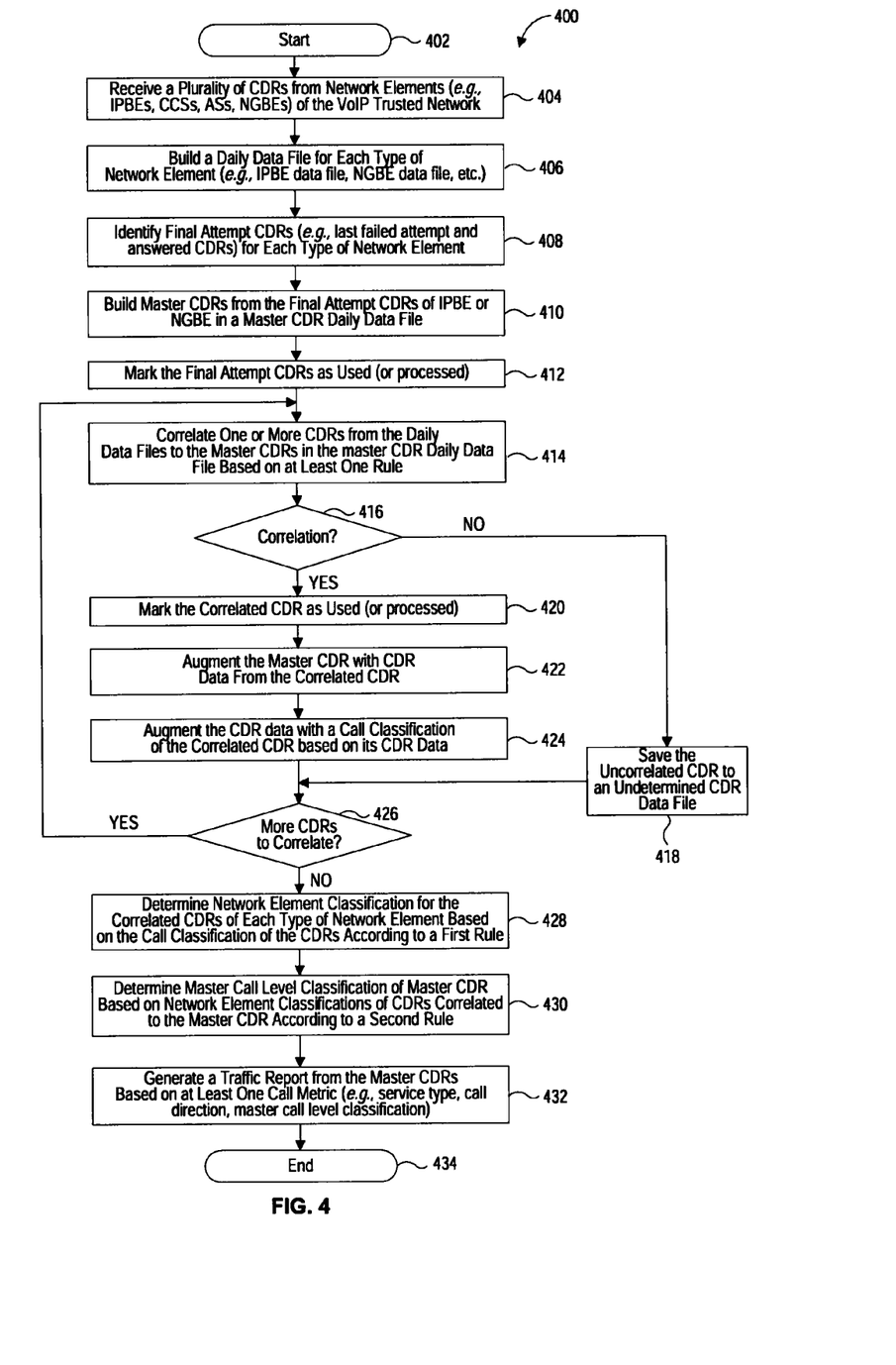
FIG. 4 illustrates a flowchart of an example method of building at least one master CDR and generating a traffic report from the at least one master CDR.

FIG. 4 illustrates a flowchart of an example method 400 of building at least one master CDR and a generating a traffic report from the at least one master CDR. The method 400 starts at operation 402 in which one or more calls have been attempted/connected over the VoIP trusted network 102. At this point, a plurality of CDRs associated with each of the calls has been generated by the network elements (NEs) 104-116 and collected by the network element CDR collector system 130. At operation 404, the CDRs generated by the network elements 104-116 of the VoIP trusted network 102 are received. For example, the CDR receive device 134 of the master CDR system 132 can receive periodically or upon request the plurality of CDRs from the network element CDR collector system 130. The network element CDR collector system 130 can deliver CDRs to CDR receiver device 134 continuously throughout the day, usually within 5 to 15 minutes of receiving the CDRs. The network element CDR collector system 130 includes sufficient storage capacity for several days of CDRs, however. The storage is used in the event that CDR receiver device 134 or the data path between the network element CDR collector system 130 and the CDR receiver device 134 is unavailable.

At operation 406, a daily data file is built or generated for each type of network element (e.g., IPBE data file, CCS data file, AS data, NGBE data file, as well as any other NE data file of VoIP trusted network 102). A particular data file includes all CDRs for a particular NE type, such as CDRs from IPBE network elements 104, 114 of VoIP trusted network 102. For example, the daily data file build device 136 of the master CDR system 132 can build and store the data files in memory or a storage device. At operation 408, final attempt CDRs are identified for the calls in the respective data files of the different NE types (e.g., IPBEs 104, 114, CCSs 108, ASs 110, NGBEs 106, 116). For example, the final attempt CDRs of calls in the IBPE data file can include last failed call attempt CDRs for the calls attempted via any IPBEs 104, 114 but not answered and answered call CDRs for calls that were connected via any IPBEs 104, 114.

Further with reference to operation 406, non-final attempt CDRs can be identified by comparing the end time of an attempt CDR with the start time of other CDRs having the same calling and called telephone numbers. If another CDR having a later start time is found and the start time is no more that a configurable time later than the end time of the attempt CDR, then that attempt CDR is identified as a non-final attempt CDR. Accordingly, CDRs not identified as non-final attempt CDRs are therefore identified as final attempt CDRs. The final attempt CDR identification device 138 of the master CDR system 132 can identify the final attempt CDRs as described above.

At operation 410, master CDRs are built in the master CDR data file from the IPBE and NGBE (or originating NE's) final attempt CDRs identified at operation 408. The master CDR build device 140 of the master CDR system 132 can build the master CDRs. At operation 412, the final attempt CDRs are marked "used" to indicate that they have been processed. For example, the record type field 202 of IBPE CDR 200-A can include STOP indicating that the call was connected via that IBPE, or ATTEMPT indicating that the call was attempted via that IBPE but the called party did not answer the call. The following operations 414-422 and 426 can be performed by the CDR correlation device 142 of the master CDR system 132. At operation 414, one or more CDRs in the daily data files are correlated to the master CDRs in the master CDR data file based on at least one correlation rule. Each correlation rule described below can be used successively until a correlation results or no correlation results after the correlation rules are exhausted. Alternate or additional correlation rules can be used for the correlation of NE CDRs to the master CDRs.

A first correlation rule that can be used to determine correlation of a CDR to a master CDR is IP:port plus time. More specifically, a CDR (X) is correlated to a master CDR (M) when IP:port of CDR (X) is equal to IP:port of master CDR (M) and the IP:port of master CDR (M) is a non-dummy string; and the absolute value (End Time of CDR (X)–End Time of master CDR (M))<t1 or absolute value (Start Time of CDR (X)–Start Time of master CDR (M))<t1; where t1 is a first predetermined time period. The first predetermined time period can be 30 seconds. Other time periods can be used for the first predetermined time period.

A second correlation rule that can be used to determine correlation of a CDR to a master CDR is calling/called telephone numbers plus time. More specifically, a CDR (X) is correlated to master CDR (M) when calling and called telephone number of CDR (X) are equal to the calling and called telephone numbers of master CDR (M); and the absolute value (End Time of CDR (X)–End Time of master CDR (M))<t2 or absolute value (Start Time of CDR (X)–Start Time of master CDR (M))<t2; where t2 is a second predetermined time period. The second predetermined time period can be 5 seconds. Other time periods can be used for the second predetermined time period.

A third correlation rule that can be used to determine correlation of a CDR to a master CDR is IP:port plus calling/called telephone numbers plus time. More specifically, a CDR (X) is correlated to master CDR (M) when IP:port of CDR (X) is equal to IP:port of master CDR (M) and the IP:port of master CDR (M) is a non-dummy string; and calling telephone number of CDR (X) is equal to the calling telephone number of master CDR (M) and called telephone number of CDR (X) is equal to the called telephone number of master CDR (M); and the absolute value (End Time of CDR (X)–End Time of master CDR (M))<t3 and absolute value (Start Time of CDR (X)–Start Time of master CDR (M))<t3; where t3 is a third predetermined time period. The third predetermined time period can be 600 seconds. Other time periods can be used for the third predetermined time period.

At operation 416 a determination is made as to whether a CDR is correlated to a master CDR using at least one correlation rule described above. If a CDR is not correlated to a master CDR at operation 416, then the method 400 continues at operation 418, where the uncorrelated CDR is saved to an undetermined CDR data file. Thereafter, the method 400 continues at operation 426 as described in greater detail below. Alternatively, if the CDR is correlated to the master CDR at operation 416, the method 400 continues at operation 420, where the correlated CDR is marked "used" to ensure that the correlated CDR is correlated to at most one master CDR. At operation 422, the master CDR is augmented with CDR data from the correlated CDR as described above with reference to FIGS. 2 and 3.

At operation 424, the CDR data of the master CDR for the correlated CDR is augment with a call classification of the correlated CDR that is derived or determined from the CDR data. The call classification of the CDR data for the correlated CDR is one of: cutoff, answered, ring-no-answer, user-busy, dialed-number-error, and blocked. The call classifications can be determined from the final handling codes of the constituent CDR data. The master CDR classification device 144 of the master CDR system 132 can augment the call classifications as described above at operation 424.

At operation 426, a determination is made as to whether there are more CDRs to correlate to the master CDRs. If it is determined that there are more CDRs at operation 426, the method 400 continues with operations 414-426. Alternatively, if it is determined that there are no more CDRs at operation 426, the method 400 continues at operation 428, where a network element (NE) classification is determined for the correlated CDRs of each type of network element (NE) based on the call classification of the constituent CDR data in the master CDR according to a first classification rule. More specifically, the NE classification is determined from the correlated CDR data for a given NE type by determining, based on the call classifications of these CDR data, the entry that is leftmost in the following classification list: cutoff, answered, ring-no-answer, user busy, dialed number error, and blocked. The NE classifications can be maintained temporarily in memory or a storage device.

At operation 430, a master call level classification is determined for the master CDR based on the NE classifications of CDRs correlated to the master CDR according to a second classification rule. More specifically, the master call level classification is determined from the NE classifications of operation 428 by determining, the entry that is leftmost in the following classification list: cutoff, answered, blocked, ring-no-answer, dialed number error, user busy, and null. Operations 428 and 430 can be performed by master CDR classification device 144 of the master CDR device 132.

At operation 432, a traffic report is generated from the master CDRs based on at least one call metric of the master CDRs, such as service type, call direction and master call level classification. An example report is described in greater detail below with reference to FIG. 5. The traffic report can be generated by the traffic report generation device 146 of the master CDR system 132. Although not shown explicitly in FIG. 4, the generated traffic report can be requested and transmitted to the computing device 134 by the request receiving device 148 of the master CDR system 132.

Figure 5:
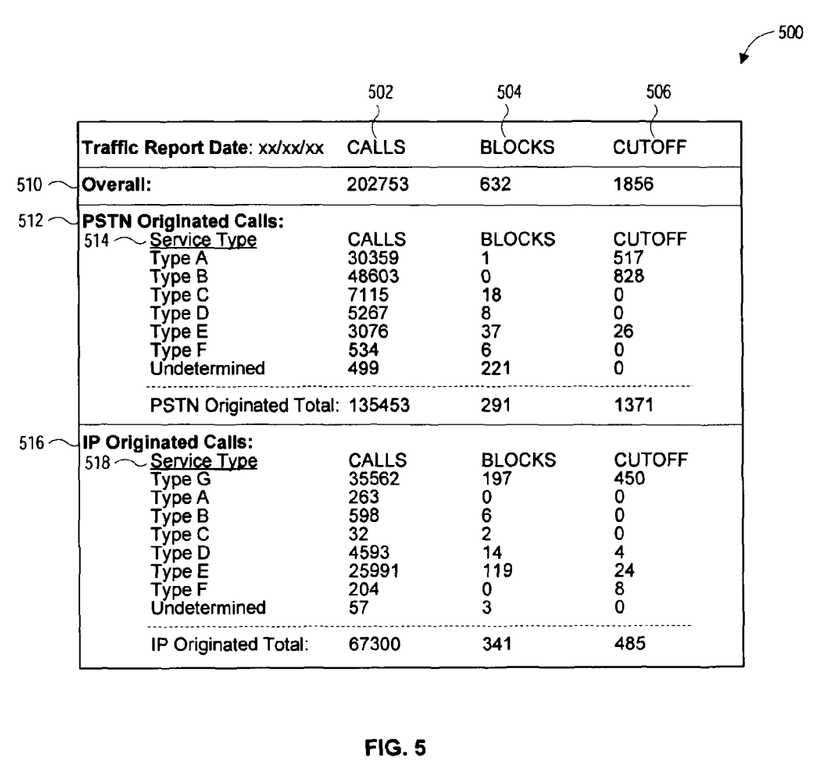
FIG. 5 illustrates an example traffic report for the VoIP trusted network of FIG. 1 generated by the master CDR system 132 illustrated in FIG. 1.

FIG. 5 is an example traffic report 500 for the VoIP trusted network 102 generated by the master CDR system 132 of FIG. 1. The traffic report includes a daily total number of calls 502 over the VoIP trusted network 102. Out of the daily total number of calls 502, the traffic report 500 also includes the daily total number of blocked calls 504 and daily total number of cutoff calls 506. The totals 502, 504 and 506 can be tallied based the master CDRs. For example, daily total calls 502 can be the overall number of master CDRs. The daily total number of blocked calls 504 can be the number of master CDRs that have a call level classification of "blocked". The daily total number of cutoff calls 504 can be the number of master CDRs that have a call level classification of "cutoff". Additional daily call level classification totals can be provided for ring-no-answer, dialed number error and user busy.

The traffic report 500 also breaks down the daily totals 502, 504, 506 over the VoIP trusted network 102 by call direction 512, 516. Daily total calls and calls classified by master call level classification can be provided for each call directions 512, 516. The call direction can be obtained from CDR data 342 or CDR data 342 of the master CDR 300. For each call direction 512, 516 calls can be broken down further by service type 514, 518. Service type can be obtained from service type 304 of the master CDR 300. For each service type 514, 518, the traffic report 500 can indicate daily total calls, and calls classified by master call level classification, such as "blocked" and "cutoff". Additional daily call level classification totals fort the service types 514, 518 can be provided for ring-no-answer, dialed number error and user busy.

FIG. 6A illustrates example call-related information of an example CDR 600-A generated by the IPBE 104 of FIG. 1. The record type 602 indicates processing-related information indicating that the CDR 600-A is associated with an answered call ("STOP"). The originating IP:port 604 indicates an IP address <10.0.124.5> and a port <17040> of the originating NE for a call. The terminating IP:port 606 indicates an IP address <10.0.75.164> and a port <26904> of a terminating NE for the call. In the foregoing example, field 604 can indicate the originating IP:port of the IBPE 104 and field 606 can indicate the IP:port of the terminating NGBE 116 for the call. As will be described in greater detail below, terminating NGBE 106 for the call attempted but failed to connect the call, while NGBE 116 successfully connected the call.

The start time 608 indicates the date <DEC 01 2009> and time <16:46:07.1> associated with the start of the call the end time 610 indicates the date <DEC 01 2009> and time <16:48:18.0> associated with the end of the call. The call length is 131 seconds, rounded to the nearest second. In some embodiments, the call length can be a field that is provided and populated by the originating IBPE 104. The final handling code 612 is a call completion code <0> indicating that the call has been completed normally. The release party indicator 614 of <1> indicates that the originating device 122 released the call.

The calling telephone number 616 indicates the telephone number <999-555-1111> of the originating device (e.g., VoIP device 122), while the called telephone number 618 indicates the telephone number <777-555-9999> of the terminating device (e.g., PSTN device 128). The call direction 620 indicates a direction of <IP_TO_PSTN> of the call between the device 122, 128. The service type 622 indicates the service type that is associated with the call is service type "B". The IPBE ID 624 indicates <NewYork__12> as the device identification of the IPBE 104 that has generated the CDR 600-A. The IPBE CDR ID 226 indicates a unique identification <ibpe01547805> of the CDR 600-A generated by the NewYork__12 (e.g., IPBE 104).

FIG. 6B illustrates example call-related information of an example CDR 600-B generated by the CCS 108 of FIG. 1. The record type 628 indicates processing-related information indicating that the CDR 600-B is associated with an answered call ("STOP"). The called telephone number 630 indicates the telephone number <777-555-9999> of the terminating PSTN device 128, while the calling telephone number 632 indicates the telephone number <999-555-1111> of the originating device VoIP device 122. The final handling code 634 of <16> indicates that the call has been completed normally.

The originating IP:port 636 indicates the IP address <10.0.124.5> and port <17040> of the originating IPBE 104 for the call. It is noted that a terminating IP:port, call direction and the service type are not included in the CDR 600-B. The start time 638 indicates the date <2009-01-12> and time <16:46:07.8> associated with the start of the call and the end time 640 indicates the date <2009-01-12> and time <16:48:18.0> associated with the end of the call. The CCS ID 642 indicates <Washington__5> as the device identification of the CCS 108 that generated CDR 600-B. The CCS CDR ID 644 indicates a unique identification <ccs01255218> of the CDR 600-B generated by Washington__5 (e.g., CCS 108).

FIG. 6C illustrates example call-related information of an example CDR 600-C generated by the AS 110 of FIG. 1. The record type 646 indicates processing-related information as indicating that the CDR 600-C is associated with an answered call ("STOP"). The start time 648 indicates the date <20091201> and time <16:46:07.2> associated with the start of the call and the end time 650 indicates the date <20091201> and time <16:48:17.9> associated with the end of the call. The values of fields 648, 650 can be different than in like fields of CDRs 600-A, 6000B. The final handling code 652 of <487> indicates that the call has been completed normally and the release party indicator 654 of <1> indicates that device 122 released the call.

The calling telephone number 656 indicates the telephone number <999-555-1111> of the originating VoIP device 122, while the called telephone number 658 indicates the telephone number <777-555-9999> of the terminating PSTN device 128. The originating IP:port 660 indicates the IP address <10.0.124.5> and port <17040> of the originating IPBE 104 for the call. The service type 662 indicates the service type that is associated with the call is service type "B". The AS ID 664 indicates <Atlanta_2> as the device identification of the AS 108 that has generated the CDR 600-C. The AS CDR ID 666 indicates a unique identification <as01298853> of the CDR 600-C generated by Atlanta_2 (e.g., AS 110).

FIG. 6D illustrates example call-related information of an example CDR 600-D generated by the NGBE 106 of FIG. 1. The record type 602 indicates processing-related information indicating that the CDR 600-D is associated with a failed attempt for the call ("ATTEMPT"). The start time 670 indicates the date <12/01/2009> and time <16:46:07.8> associated with the start of the call. The calling telephone number 672 indicates the telephone number <999-555-1111> of the originating VoIP device 122, while the called telephone number 674 indicates the telephone number <777-555-1111> of the terminating PSTN device 128. The end time 676 indicates the date <12/01/2009> and time <16:46:07.8> associated with the end of the call. It is noted that the start time 670 and end time 676 indicate the same time for the failed attempt by the NGBE 106.

The final handling code 678 is a call completion code <34> indicating that the call failed to complete. The call direction 680 indicates a direction <IP_TO_PSTN> of the call between the devices 122, 128. The release party indicator 682 of <0> indicates that the NGBE 106 released the call.

The NGBE IP:port 684 indicates an IP address <10.0.85.62> and port <32000> of the unsuccessful NGBE 106 for the call. The IPBE IP:port 686 indicates an IP address <10.0.124.5> and port <17040>. It is noted that the IP:port of field 686 indicate the originating IPBE 104 of the call. The service type 688 indicates the service type that is associated with telephone call is service type "B". The NGBE ID 690 indicates <Chicago_4> as the device identification of the NGBE 106 that has generated the CDR 600-D. The NGBE CDR ID 692 indicates a unique identification <ngbe00366391> of the CDR 600-D generated by the Chicago_4 (e.g., NGBE 106).

FIG. 6E illustrates example call-related information of an example CDR 600-E generated by the NGBE 116 of FIG. 1. The record type 668 indicates processing-related information indicating that the CDR 600-E is associated with an answered call ("STOP"). The start time 670 indicates the date <12/01/2009> and time <16:46:07.9> associated with the start of the call. The calling telephone number 672 indicates the telephone number <999-555-1111> of the originating VoIP device 122, while the called telephone number 674 indicates the telephone number <777-555-1111> of the terminating PSTN device 128. The end time 676 indicates the date <12/01/2009> and time <16:48:18.2> associated with the end of the call.

The final handling code 678 is a call completion code <16> indicating that the call completed normally. The call direction 680 indicates a direction <IP_TO_PSTN> of the call between the devices 122, 128. The release party indicator 682 of <1> indicates that the IBPE 104 released the call. More specifically, VoIP device 122 hangs up first at the end of the call, which causes the IPBE 104 to release the call and then the NGBE 116 to release the call.

The NGBE IP:port 684 indicates an IP address <10.0.75.164> and port <26904> of the successful NGBE 116 for the call. The IPBE IP:port 686 indicates an IP address <10.0.124.5> and port <17040> of the originating IPBE 104 of the call. The service type 688 indicates the service type that is associated with telephone call is service type "B". The NGBE ID 690 indicates <Cleveland_1> as the device identification of the NGBE 116 that has generated the CDR 600-E. The NGBE CDR ID 692 indicates a unique identification <ngbe06957200> of the CDR 600-E generated by the Cleveland_1 (e.g., NGBE 116).

Figure 7:
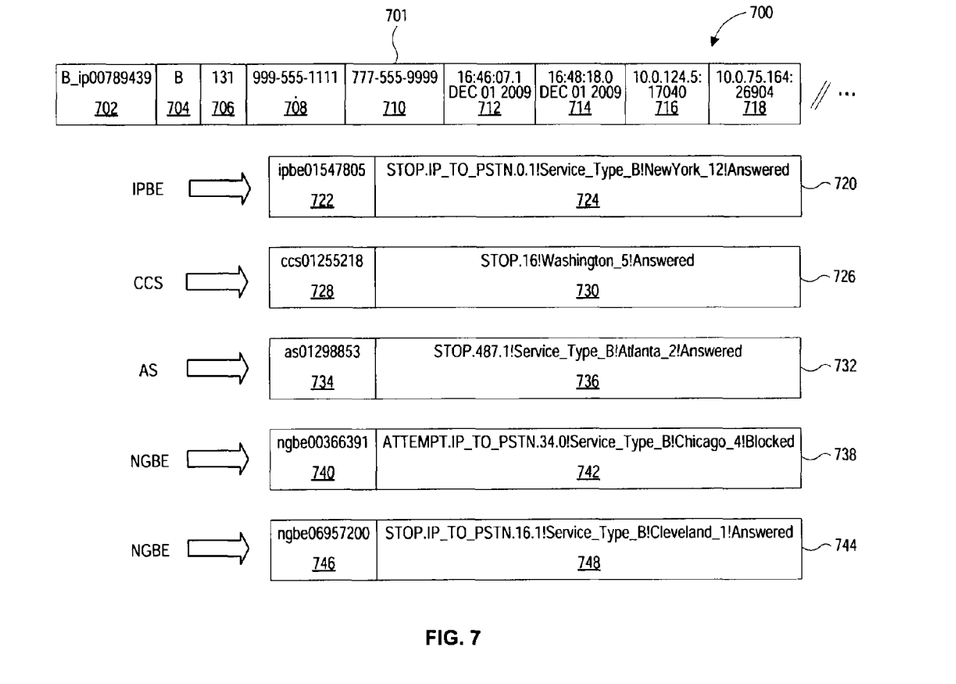
FIG. 7 illustrates an example master CDR generated by a master CDR system illustrated in FIG. 1 from the example CDRs illustrated in FIGS. 2A-2D.

FIG. 7 illustrates example call-related information of an example master CDR 700 generated from the example CDRs 600-A-CDR 600-E of FIG. 6 by the master CDR system 132 of FIG. 1. The master CDR 700 includes a base part of call-related information 701 that is obtained from the CDR 600-A of the originating IBPE 104 associated with a call from device 122 to device 128. The master CDR 700 further includes one or more additional parts of call-related information 720, 726, 732, 738 and 742 that are obtained from one or more CDRs 600-A-600-E that are correlated to the master CDR 700 for the call.

The base part of call-related information 701 includes a master CDR ID 702 that indicates a unique identification <B_ip00789439> of the master CDR generated by the master CDR system 132. The service type 704 of <B> is obtained from the service type 622 of CDR 600-A generated by the originating IBPE 104. The call length 706 of <131> can be determined from the start time 608 of <16:46:07.1> and the end time 610 <16:48:18.0>. The calling telephone number 708 and the called telephone number 710 are obtained from the respective date/time fields 616, 618 of CDR 600-A. The start time 712 and the end time 714 are obtained form the date/time fields 608, 610 of CDR 600-A. The originating IP:port 716 indicates the IP address and port of the originating IPBE 104 obtained from field 604 of CDR 600-A. The terminating IP:port 718 is obtained from field 606 of CDR 600-A.

The one or more additional parts of example call-related information 720, 726, 732, 738 and 744 can be obtained from the one or more CDRs 600-A-600-E, which are correlated to the master CDR 700 for the call. Each additional part 720, 726, 732, 738 and 744 can also include a call classification derived or determined from other call-related information of that additional part for the associated NE. The call classification of the NE associated with that call is one of: cutoff, answered, ring-no-answer, user-busy, dialed-number-error, and blocked. For example, as will be described below in greater detail below, additional part 738 includes a call classification of "Blocked" indicating that the call was blocked when attempted through NGBE 106, and additional part 744 includes a call classification of "Answered" indicating that the call was answered or connected when re-attempted through NGBE 116. The correlation of CDRs to a master CDR was described in relation to FIG. 4.

The call-related information of additional part 720 from the correlated CDR 600-A of IPBE 104 includes the following call-related information: correlated CDR ID 722 and concatenated CDR data 724. The correlated CDR ID 722 is <ipbe01547805> of field 626 in CDR 600-A. The concatenated CDR data 724 includes record type 602 of <STOP>, call direction 620 of <IP_TO_PSTN>, final handling code 612 of <0>, release party indicator 614 of <1>, service type 622 of <service_type_B>, IPBE ID 624 of <NewYork__12> and a call classification of <Answered> that is determined from the foregoing call-related information of the additional part 720 for the IPBE 104. The call classification "Answered" can be determined via a lookup table using as a key "STOP.IP_TO-PSTN.0.1" which can be one of several table records associated with a normal release of an answered call.

The call-related information of additional part 726 from the correlated CDR 600-B of CCS 108 includes the following call-related information: correlated CDR ID 728 and concatenated CDR data 730. The correlated CDR ID 728 is <ccs01255218> of field 644 in CDR 600-B. The concatenated CDR data 730 includes record type 628 of <STOP>, final handling code 634 of <16>, CCS ID 644 of <Washington__5> and a call classification of <Answered> that is determined from foregoing call-related information of the additional part 726 for the CCS 108. Similarly, the call classification can be determined as described above with reference to the additional part 720.

The call-related information of additional part 732 from the correlated CDR 600-C of AS 110 includes the following call-related information: correlated CDR ID 734 and concatenated CDR data 736. The correlated CDR ID 734 is <as01298853> of field 666 in CDR 600-C. The concatenated CDR data 736 includes record type 646 of <STOP>, final handling code 652 of <487>, release party indicator 654 of <1>, service type 662 of <service_type_B>, CCS ID 664 of <Atlanta__2> and a call classification of <Answered> that is determined from foregoing call-related information of the additional part 732 for the AS 110. Similarly, the call classification can be determined as described above with reference to the additional part 720.

The call-related information of additional part 738 from the correlated CDR 600-D of NGBE 106 includes the following call-related information: correlated CDR ID 740 and concatenated CDR data 742. The correlated CDR ID 740 is <ngbe00366391> of field 692 of CDR 600-D. The concatenated CDR data 742 includes record type 668 of <ATTEMPT>, call direction 680 of <IP_TO_PSTN>, final handling code 678 of <34>, release party indicator 682 of <0>, service type 688 of <Service_type_B>, NGBE ID 690 of <Chicago__4> and a call classification of <Blocked> that is determined from the foregoing call-related information of the additional part 738 for the NGBE 106. Similarly, the call classification can be determined as described above with reference to the additional part 720.

The call-related information of additional part 744 from the correlated CDR 600-E of NGBE 116 includes the following call-related information: correlated CDR ID 746 and concatenated CDR data 748. The correlated CDR ID 746 is <ngbe06957200> of field 692 of CDR 600-E. The concatenated CDR data 748 includes record type 668 of <STOP>, call direction 680 of <IP_TO_PSTN>, final handling code 678 of <16>, release party indicator 682 of <1>, service type 688 of <Service_type_B>, NGBE ID 690 of <Cleveland__1> and a call classification of <Answered> that is determined from the foregoing call-related information of the additional part 744 for the NGBE 116. Similarly, the call classification can be determined as described above with reference to the additional part 720.

An operational example based on the example FIGS. 5-7 is provided below. The operational example is of an IP_TO_PSTN call between VoIP device 122 and PSTN device 128, which call was attempted through NGBE 106 but failed because of congestion in the PSTN 124, and which call was re-tried through NGBE 116 that succeeded in connecting the call.

In the operation example, calling VoIP Device 122 associated with a telephone number <999-555-1111> calls a telephone number <777-555-9999> associated with called PSTN device 128 on Dec. 1, 2009. The call progresses via IP network 118 and is directed by routing element 120 to enter VoIP trusted network 102 via <NewYork__12> IP border element (e.g., IBPE 104). The IBPE 104 signals a <Washington__5> call control server (e.g., CCS 108), which in turn signals <Atlanta__2> application server (e.g., AS 110). The AS 110 responds to the CCS 108, which routes the call to <Chicago__4> network gateway border element (e.g., NGBE 106). NGBE 106 directs the call to the PSTN switch 126 of the public switched telephone network 124.

However, in this operational example, the call is blocked from connection in the public switched telephone network 124 due to congestion. The PSTN switch 126 returns a connection error to the NGBE 106. The NGBE 106 signals the CCS 108 with a final handling code <34>, which indicates to the CCS 108 that the call should be re-attempted via different NGBE. The CCS 108 re-routes the call to the <Cleveland__1> network gateway border element (e.g., NGBE 116), which in turn directs the call to the PSTN switch 126 of the public switched telephone network 124. This time, the PSTN switch 126 successfully signals the called PSTN device 128, which answers the call.

On the basis of the foregoing operational example, the call produces a total of 5 CDRs: one CDR from IPBE 104, CCS 108, and AS 110; and two CDRs from NGBEs 106, 116. These example CDRs are illustrated in FIGS. 6A-6E.

Now with reference to method 400 of FIG. 4, the foregoing CDRs for the call are received from the network elements 104, 108, 110, 106 and 116 at operation 404 and included in respective daily data files for Dec. 1, 2009 at operation 406.

At operation 408, the single IPBE, CCS, and AS CDRs are determined as final attempt CDRs for each respective type of network element, IPBE, CCS and AS, while the second NGBE CDRs is determined to be a final attempt for network element type NGBE. The first NGBE CDR 600-D, however, is identified as a non-final attempt because there is a later NGBE CDR 600-E with the same calling and called number and a start time that is 0.1 seconds later than the end time of the first NGBE CDR 600-D.

At operation 410, a master CDR is generated or built from the IPBE CDR 600-A because it is final attempt CDR of an originating network element (e.g., IBPE 104). At operation 414, the other CDRs 600-B-600-E are correlated to the master CDR 600-A according to one of the three correlation rules described with reference to FIG. 5. For example, the CDRs 600-B-600-E are correlated to the master CDR 600-A because the originating IP:Ports, and the start times (or end times) agree within a time window, as described with reference to FIG. 5.

At operation 422, call-related information is augmented to the master CDR 700 from the correlated CDRs 600A-600-E. At operation 424, the call-related information in the master CDR 700 from each CDR is augmented with a call classification. At operation 428, a network element (NE) classification is determined for each type of network element based on the call classification. Because each of the IPBE 104, CCS 108, and AS 110 has a single correlated CDR, the NE classification by the foregoing NE type is <Answered>. Although, the NGBE type had two CDRs, the resultant NE classification for NGBE type is also <Answered>.

At operation 430, the master call level classification for the master CDR is determined to be <Answered> because all four NE type classifications were <Answered>. It should be noted that while the foregoing operational example is provided for one call between VoIP device 122 and PSTN device 128, one or more additional calls can be processed in a similar fashion to generate master CDRs as described in the operational example. Thereafter, a traffic report can be generated from the master CDRs and transmitted to the computing device 134 for display.

Figure 8:
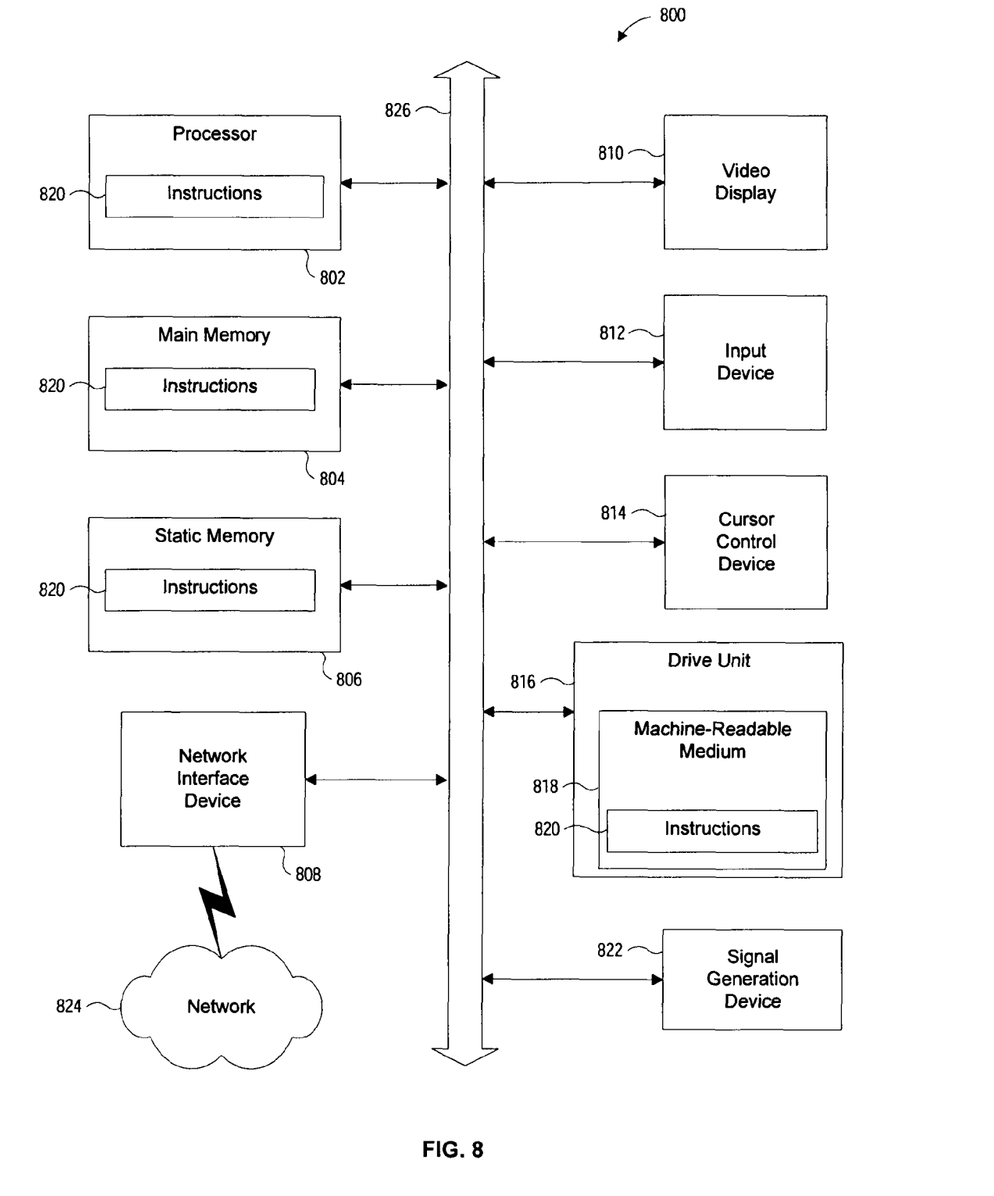
FIG. 8 is a block diagram of a general computer system.

FIG. 8 is a block diagram of a general computer system 800. The computer system 800 can include a set of instructions that can be executed to cause the computer system 800 to perform any one or more of the methods or computer based functions disclosed herein with respect to FIGS. 1-7. The computer system 800 or any portion thereof, may operate as a standalone device or may be connected (e.g., using a network 824) to other computer systems or devices disclosed herein with respect to FIGS. 1-7. For example, the computer system 800 can include or be included within any one or more of the VoIP devices, routing elements, network elements, CDR collector system, master CDR system, or any other devices or systems disclosed herein with respect to FIGS. 1-7.

In a networked deployment, the computer system 800 may operate in the capacity of a server or a client machine in a server-client network environment, or a peer machine in a peer-to-peer (or distributed) network environment. The computer system 800 can also be implemented as or incorporated into various devices, such as a personal computer (PC), a tablet PC, a personal digital assistant (PDA), a web appliance, a communications device, a mobile device, a wireless telephone, a control system, a network router, switch or bridge, a server, client or any other machine capable of executing a set of instructions (sequential or otherwise) that specify actions to be taken by that machine. Further, while a single computer system 800 is illustrated, the term "system" shall also be taken to include any collection of systems or sub-systems that individually or jointly execute a set, or multiple sets, of instructions to perform one or more computer functions.

As illustrated in FIG. 8, the computer system 800 may include a processor 802, e.g., a central processing unit (CPU), a graphics-processing unit (GPU), or both. Moreover, the computer system 800 can include a main memory 804 and a static memory 806 that can communicate with each other via a bus 826. As shown, the computer system 800 may further include a video display unit 810, such as a liquid crystal display (LCD), an organic light emitting diode (OLED), a flat panel display, a solid state display, or a cathode ray tube (CRT). Additionally, the computer system 800 may include an input device 812, such as a keyboard, and a cursor control device 814, such as a mouse. The computer system 800 can also include a disk drive unit 816, a signal generation device 822, such as a speaker or remote control, and a network interface device 808.

In a particular embodiment, as depicted in FIG. 8, the disk drive unit 816 may include a machine or computer-readable medium 818 in which one or more sets of instructions 820 (e.g., software) can be embedded. Further, the instructions 820 may embody one or more of the methods or logic as described herein with reference to FIGS. 1-7. In a particular embodiment, the instructions 820 may reside completely, or at least partially, within the main memory 804, the static memory 806, and/or within the processor 802 during execution by the computer system 800. The main memory 804 and the processor 802 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with the various embodiments, the methods described herein may be implemented by software programs that are tangibly embodied in a processor-readable medium and that may be executed by a processor. Further, in an example, non-limited embodiment, implementations can include distributed processing, component/object distributed processing, and parallel processing. Alternatively, virtual computer system processing can be constructed to implement one or more of the methods or functionality as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, example embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software which implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

Thus, a system and method of processing call detail records (CDRs) have been described. Although specific example embodiments have been described, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A method of processing call detail records (CDRs) of multiple network elements in a communication network, the method comprising:
   identifying, by a processing device, a final attempt call detail record out of a plurality of call detail records from the multiple network elements by a type of network element, the final attempt call detail record associated with one of a last failed call attempt and a last connected call attempt;
   building, by the processing device, a master call detail record from the final attempt call detail record;
   correlating, by the processing device, a call detail record from the plurality of call detail records to the master call detail record according to a correlation rule; and
   augmenting, by the processing device, the master call detail record with call detail record data from the call detail record correlated to the master call detail record.

2. The method of processing call detail records according to claim 1, further comprising receiving the plurality of call detail records associated with calls from the multiple network elements of the communication network.

3. The method of processing call detail records according to claim 1, further comprising retaining a call detail record that cannot be correlated to the master CDR.

4. The method of processing call detail records according to claim 1, further comprising augmenting the call detail record data of the call detail record correlated to the master call detail record with a call classification based on the call detail record data.

5. The method of processing call detail records according to claim 4, further comprising determining network element classification based on the call classification of the call data record data as augmented for the call detail record correlated to the master call detail record by the type of network element according to a first classification rule.

6. The method of processing call detail records according to claim 5, further comprising determining master call level classification of the master call detail record based on the network element classification for the call detail record correlated to the master call detail record according to a second classification rule.

7. The method of processing call detail records according to claim 6, further comprising generating a traffic report from the master call detail record based on a call-related metric.

8. A system to process call detail records of multiple network elements in a communication network, the system comprising:
   a processing device; and
   a machine-readable medium to store instructions that, when executed by the processing device, cause the processing device to perform operations comprising:
   identifying a final attempt call detail record out of a plurality of call detail records from multiple network elements of a communication network by at least one type of network element, the final attempt call detail record associated with one of a last failed call attempt and a last connected call attempt;
   building a master call detail record from the final attempt call detail record;
   correlating a call detail record from the plurality of call detail records to the master call detail record according to a correlation rule;
   augmenting the master call detail record with call detail record data from the call detail record correlated to the master call detail record.

9. The system to process call detail records according to claim 8, wherein the operations further comprise receiving the plurality of call detail records associated with calls from the multiple network elements of the communication network.

10. The system to process call detail records according to claim 8, wherein the operations further comprise augmenting call detail record data of the call detail record correlated to the master call detail record with a call classification based on the call detail record data.

11. The system to process call detail records according to claim 10, wherein the operations further comprise determining network element classification based on the call classification of the call detail record as augmented for the call detail record correlated to the master call detail record by the type of network element according to a first classification rule.

12. The system to process call detail records according to claim 11, wherein the operations further comprise determining master call level classification of the master call detail record based on the network element classification for the call detail record correlated to the master call detail record according to a second classification rule.

13. The system to process call detail records according to claim 12, wherein the operations further comprise generating a traffic report from the master call detail record based on a call-related metric.

14. A tangible machine-readable storage medium having instructions stored thereon that, when executed by a processor, cause the processor to perform operations comprising:
    identifying a final attempt call detail record out of a plurality of call detail records from multiple network elements in a communication network by a type of network element, the final attempt call detail record associated with one of a last failed call attempt and a last connected call attempt;
    building a master call detail record from the final attempt call detail record;
    correlating a call detail record from the plurality of call detail records to the master call detail record according to a correlation rule; and
    augmenting the master call detail record with call detail record data from the call detail record correlated to the master call detail record.

15. The tangible machine-readable storage medium according to claim 14, wherein the operations further comprise receiving the plurality of call detail records associated with calls from the multiple network elements of the communication network.

16. The tangible machine-readable storage medium according to claim 14, wherein the operations further comprise retaining a call detail record that cannot be correlated to the master call detail record.

17. The tangible machine-readable storage medium according to claim 14, wherein the operations further comprise augmenting the call detail record data of the call detail record correlated to the master call detail record with a call classification based on the call detail record data.

18. The tangible machine-readable storage medium according to claim 17, wherein the operations further comprise determining network element classification based on the call classification of the call detail record data as augmented for the call detail record correlated to the master call detail record by the type of network element according to a first classification rule.

19. The tangible machine-readable storage medium according to claim 18, wherein the operations further comprise determining master call level classification of the master call detail record based on the network element classification for the call detail record correlated master call detail record according to a second classification rule.

20. The tangible machine-readable storage medium according to claim 19, wherein the operations further comprise generating a traffic report from the master call detail record based on a call-related metric.

* * * * *